United States Patent [19]
Imai et al.

[11] Patent Number: 5,486,948
[45] Date of Patent: Jan. 23, 1996

[54] STEREO IMAGE FORMING APPARATUS HAVING A LIGHT DEFLECTION MEMBER IN EACH OPTICAL PATH

[75] Inventors: Hitoshi Imai, Yokohama; Muneharu Sugiura, Tokyo; Katsutoshi Hoashi, Yokohama, all of Japan

[73] Assignees: Canon Hanbai Kabushiki Kaisha; Canon Kabushiki Kaisha; Ikegami Tsushinki Co., Ltd., all of Tokyo, Japan

[21] Appl. No.: 243,515

[22] Filed: May 16, 1994

Related U.S. Application Data

[63] Continuation of Ser. No. 34,173, Mar. 18, 1993, abandoned, which is a continuation of Ser. No. 701,334, May 9, 1991, abandoned, which is a continuation of Ser. No. 497,352, Mar. 22, 1990, abandoned.

[30] Foreign Application Priority Data

Mar. 24, 1989 [JP] Japan ......................... 1-72459

[51] Int. Cl.⁶ .................................................. G02B 27/22
[52] U.S. Cl. .......................... 359/462; 359/837; 348/42
[58] Field of Search .................................. 350/132, 130, 350/131, 287, 515, 447; 358/88, 92, 3; 359/462, 464, 465, 470; 354/115, 117, 113

[56] References Cited

U.S. PATENT DOCUMENTS

| | | | |
|---|---|---|---|
| 2,767,629 | 10/1956 | Millet | 354/115 |
| 3,990,087 | 11/1976 | Marks et al. | 359/465 |
| 4,418,993 | 12/1983 | Lipton . | |
| 4,464,028 | 8/1984 | Condon | 359/462 |
| 4,509,832 | 4/1985 | Jacobsen | 359/669 |
| 4,673,260 | 6/1987 | Steinberg | 359/418 |
| 4,744,633 | 5/1988 | Sheiman | 350/132 |
| 4,818,858 | 4/1989 | Sorimachi et al. | 358/88 |

FOREIGN PATENT DOCUMENTS

| | | | |
|---|---|---|---|
| 0071531 | 2/1983 | European Pat. Off. . | |
| 0174091 | 3/1986 | European Pat. Off. . | |
| 3212691 | 10/1983 | France | 350/515 |
| 2115303 | 10/1972 | Germany . | |
| 62687 | 4/1982 | Japan | 358/88 |
| 506954 | 3/1976 | U.S.S.R. | 358/88 |
| 2107869 | 5/1983 | United Kingdom . | |

*Primary Examiner*—Paul M. Dzierzynski
*Assistant Examiner*—Darren E. Schuberg
*Attorney, Agent, or Firm*—Fitzpatrick, Cella, Harper & Scinto

[57] ABSTRACT

A stereo image forming apparatus for observing a stereo image based on two images obtained by two image taking systems. In front of each image taking system, such as a television camera, two wedge-shaped prisms are placed and made rotatable in mutually opposite directions, thus deflecting the direction of light for a varying distance to the object, in synchronization with the focusing operation of the image taking system. Thus, the apparatus can promptly focus on the object at varying distances without rotating the image taking systems themselves.

33 Claims, 4 Drawing Sheets

STEREO IMAGE FORMING APPARATUS HAVING A LIGHT DEFLECTION MEMBER IN EACH OPTICAL PATH

This application is a continuation of application Ser. No. 08/034,173 filed Mar. 18, 1993, which is a continuation of Ser. No. 07/701,334, filed May 9, 1991, which is a continuation of Ser. No. 07/497,352, filed Mar. 22, 1990, all three now abandoned.

BACKGROUND OF THE INVENTION

1. Field of the Invention

The present invention relates to a stereo image forming apparatus, and more particularly to a stereo image forming apparatus for enabling, in observing a stereo image (for example, with television images obtained by two television cameras mutually distanced by a predetermined base line), observation of a satisfactory stereo image easily and promptly over the entire distance range from an infinite distance to a very short distance, by a simple method.

2. Related Background Art

Conventionally, observation of a stereo image has been achieved by placing two image taking systems with a mutual distance of the optical axes thereof corresponding to the distance of the eyes (parallax or base line length) of the observer, and observing two images obtained by said two image taking system respectively with left and right eyes.

Figure 5:
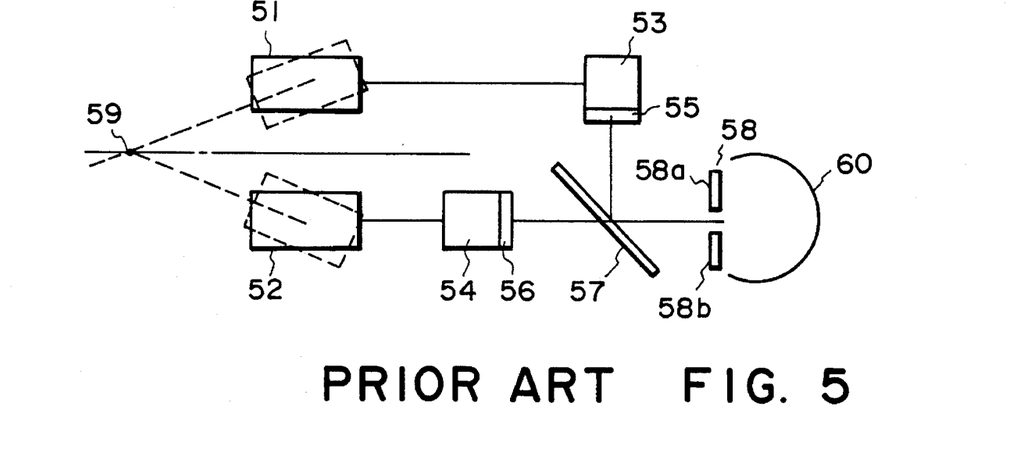
FIG. 5 is a schematic view of a conventional stereo image forming apparatus.

FIG. 5 is a schematic view of a conventional stereo image forming apparatus for observing a stereo image with television images.

Television cameras 51, 52, respectively corresponding to the right and left eyes of the observer, are rotatably positioned with a mutual distance corresponding to a predetermined base line length.

Television receivers 53, 54 respectively corresponding to the television cameras 51, 52 provide slightly different images with a parallax. There are also shown polarizing filters 55, 56 with mutually perpendicular polarizing directions; a half mirror 57; polarizing glasses 58 in which the polarizing direction of a polarizing filter 58a for the right eye is parallel to that of the polarizing filter 55 while the polarizing direction of a polarizing filter 58b for the left eye is parallel to that of the polarizing filter 56; an object 59 to be observed; and an observer 60.

In the illustrated stereo image forming apparatus, the left eye observes the image of the television receiver 54 only, while the right eye observes the image of the television receiver 53 only, by means of the polarizing filters, whereby the observer can observe a stereo image of the object 59 viewed by the television cameras 51, 52.

When the distance to the object varies, the two television cameras 51, 52 are rotated by unrepresented driving means in such a manner that the optical axes of the image taking system are directed to the object 59, as indicated by broken lines.

In the conventional stereo image forming apparatus as shown in FIG. 5, the television cameras are rotated by driving means in such a manner that the optical axes of the image taking systems are directed to the object when the distance thereof varies.

However the generally large weight of the television cameras requires a large driving force for rotating the television cameras corresponding to the change in the distance of the object. Also there is required a complex driving mechanism, and it is difficult to promptly and precisely rotate the television cameras.

SUMMARY OF THE INVENTION

The object of the present invention is to provide a stereo image forming apparatus capable of easily, promptly and precisely directing the optical axes of two image taking systems to the object when the distance of the observed object varies, thereby being adapted for use in case of observing the stereo image for example with television cameras which generally involve bulky image taking systems.

DETAILED DESCRIPTION OF THE PREFERRED EMBODIMENTS

The stereo image forming apparatus of the present invention, for observing a stereo image with two images obtained from two image taking systems, is provided with the two image taking system arranged with a predetermined base length therebetween. Deflection members, having two wedge-shaped prisms rotatable in mutually opposite directions, are provided on the optical axis and in front of each of said two image taking system. The rotating operation of said wedge-shaped prisms of the deflection members are linked with the focusing operation of a focusing lens unit of said image taking system. The object distance at which the image taking system is focused by rotative movement of the focusing lens unit thereof is caused to substantially coincide with the crossing point of the optical path of the rays of light deflected from the optical axes of two image taking systems by the rotation of the two wedge-shaped prisms constituting the deflection members.

Figure 1:
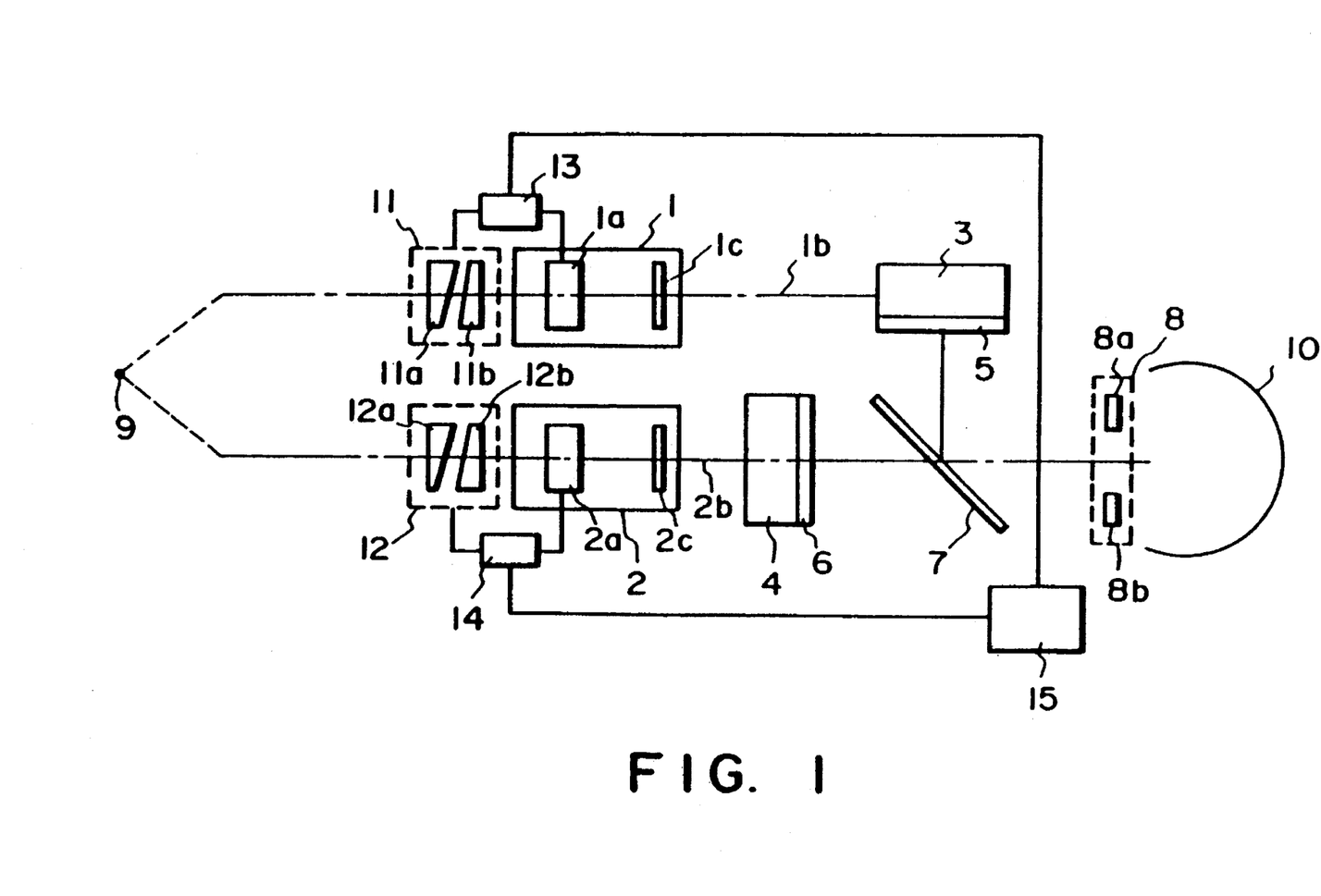
FIG. 1 is a schematic view of an embodiment of the present invention applied to television cameras.

FIG. 1 is a schematic view of a principal part of an embodiment of the present invention applied to television cameras for observing a stereo television image.

A deflection member 11 (12) is positioned in front of an image taking system 1 (2) to be explained later, and is composed of two wedge-shaped prisms 11a, 11b (12a, 12b) of a same vertical angle, combined so as to be rotatable in mutually opposite directions. In the present embodiment, two prisms 11a, 11b (12a, 12b) are so positioned as to constitute two parallel planes in a reference state (directed to an object at the infinite distance).

Image taking systems 1, 2 are composed of zoom lenses or lenses of a fixed focal length, and are so arranged that the optical axes 1b, 2b thereof are mutually parallel and separated by a predetermined base line length. A focusing lens unit 1a (2a) of the image taking system 1 (2) is rotated and moved along the optical axis 1b (2b) by drive means 13 (14), in linkage with the rotation of the deflection member 11 (12). A display unit 3 (4) displays the image of the object 9, obtained through the image taking system 1 (2). Polarizing filters 5, 6 are mounted respectively on the display units 3, 4 in such a manner that the polarizing directions thereof are mutually perpendicular. A half mirror 7 guides the image on the display unit 3 and that on the display unit 4 toward the observer 10. Polarizing glasses 8 are provided with polarizing filters 8a, 8b, respectively for the right and left eyes of the observer 10, so positioned that the polarizing directions thereof are mutually perpendicular.

The polarizing directions of said two polarizing filters 8a, 8b substantially coincide, respectively, with those of the polarizing filters 5, 6.

Stated otherwise, the polarizing direction of the polarizing filter 5 substantially coincides with that of the polarizing filter 8a, and the polarizing direction of the polarizing filter 6 substantially coincides with that of the polarizing filter 8b.

Thus the right eye of the observer 10 observes only the image of the display unit 3 obtained by the image taking system 1, while the left eye observes only the image of the display unit 4 obtained by the image taking system 2, whereby the observer can observe the stereo image.

In response to a focusing operation of the observer 10, a focusing operation unit 15 electrically drives two drive means 13 and 14 to simultaneously rotate the focusing lens units 1a and 2a thereby axially moving the same, and to rotate the prisms 11a, 11b (12a, 12b) of the deflection member 11 (12) in mutually opposite directions.

In the present embodiment, two prisms 11a, 11b (12a, 12b) of the deflection member 11 (12) are so positioned as to integrally constitute parallel planes when the observed object 9 is at the infinite distance. Also the focusing lens unit 1a (2a) of the image taking system 1 (2) is naturally focused to the infinite distance in such a state.

Thus, the light from the object at the infinite distance is focused, through the deflection member 11 (12), onto an image taking plane 1c (2c) of the image taking system 1 (2).

On the other hand, when the observed object 9 is at a finite distance, the observer electrically or manually drives the drive means 13 (14) by the focusing lens operation unit 15, thereby axially moving the focusing unit 1a (2a) of the image taking system 1 (2) so as to be focused on the observed object. At the same time, in linkage with the rotation of the focusing lens unit 1a (2a), the prisms 11a, 11b of the deflection member 11 (12) are rotated in mutually opposite directions, thereby giving a certain vertical angle integrally to said prisms and deflecting the light.

Thus, two rays on the optical axes 1b, 2b of the image taking system 1, 2 are deflected and mutually cross substantially on the plane of the observed object 9, by the synthesis (vector synthesis) of prism actions of two prisms 11a, 11b (12a, 12b).

Consequently the light from the object at finite distance is focused, through the deflection member 11 (12), onto the image taking plane 1c (2c) of the image taking system 1 (2).

As explained above, the image taking system is not rotated toward the object as in the conventional system but is fixed. Instead, when the focusing unit is axially moved, two prisms constituting the deflection member in front of the image taking system are rotated in mutually opposite directions in linkage. It is therefore made possible, without complication in the mechanism, to easily and promptly obtain a focused image of the object on each display unit, even when the distance to the object varies from time to time. The lights from the display unit 3, 4 are respectively guided to the right and left eyes of the observer, there enabling the observer to observe the stereo television image.

In the present embodiment, the components are preferably so designed that a linear relationship exists in the linkage between the rotating operation of the focusing unit of the image taking system and the rotating operation of the prisms of the deflection member, or the purpose of simplifying the mechanism, but such linear relationship is not indispensable.

In case of a non-linear relation in the linkage, there may be provided a rotation link member (corresponding to an intermediate ring) for linking the rotation of the focusing unit and that of the deflection member.

In the following there will be given specific details of the deflection member 11 of the present embodiment.

Figure 2:
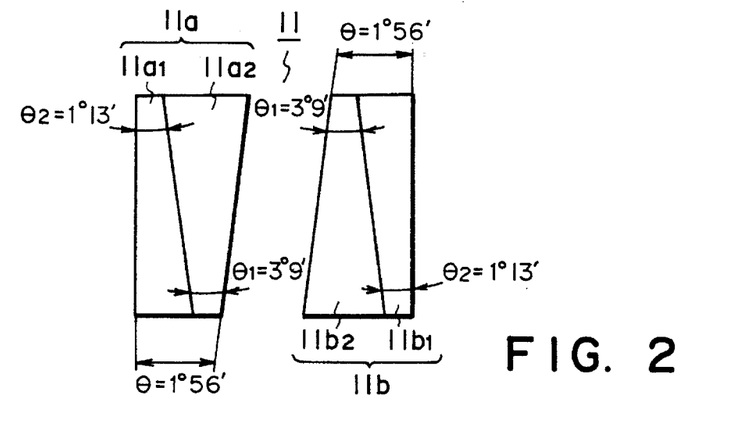
FIG. 2 is a schematic view of deflection members employed in FIG. 1.
Figure 3:
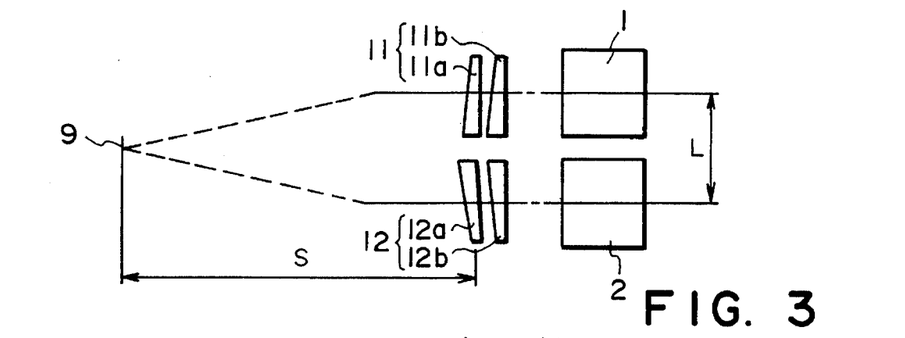
FIG. 3 is a schematic view of a part of the apparatus shown in FIG. 1.

FIG. 2 is a schematic cross-sectional view of the deflection member 11 of the present invention. In the present embodiment, two prisms 11a, 11b of the deflection member 11 are optically identical, and each prism is composed of mutually adhered two small prisms 11a1, 11a2 (11b1, 11b2) of different materials for reducing the color aberration in the prism action.

The vertical angles of said small prisms 11a1, 11a2 (11b1, 11b2) are shown in FIG. 2.

Also the material, refractive index nd and Abbe's number vd of the small prisms 11a1, 11a2 in the present embodiment are summarized in Table 1.

TABLE 1

|  | Material | nd | vd |
| --- | --- | --- | --- |
| Prism 11a1 (11b1) | SF1 | 1.71736 | 29.5 |
| Prism 11a2 (11b2) | SK14 | 1.60311 | 60.7 |

The vertical angle θ of the prism is 1°56', which corresponds, in case of a prism of a single material, for example SK14 (nd=1.60311), to 1°42'.

Table 2 summarizes, for different rotation angles α in opposite directions of the prisms 11a, 11b composed of a material SK14, the prism vertical angle θ11a (θ11b) of the prism 11a (11b) corresponding to the horizontal deflection angle, the prism vertical angle β of the deflection member 11 obtained by synthesis (vector synthesis) of two prisms 11a, 11b, and the image taking distance S from the deflection member to the observed object, namely the distance to the crossing point of the beams of the image taking systems 1, 2 for a base line length L=72 mm.

Figure 4:
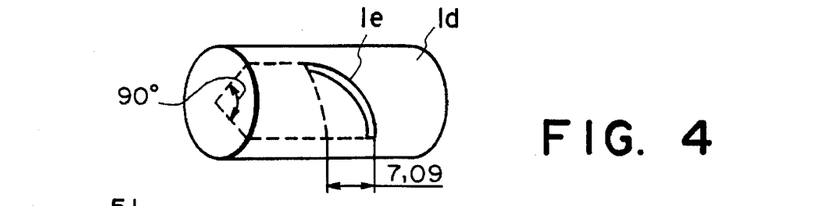
FIG. 4 is a schematic view of a lens barrel for rotating a focusing unit of the image taking system shown in FIG. 1.

FIG. 4 is a schematic view of a focusing cam groove 1e provided on a lens barrel 1d supporting the above-mentioned focusing unit 1a, for axially moving said focusing unit, in the image taking system of the present embodiment.

In the present embodiment, the focal length of the focusing unit and the shape of the focusing cam groove 1e on the lens barrel are so determined that, in the focusing operation by rotation of the lens barrel 1d, the object distance to which the focusing unit is focused coincides substantially with the observed object distance determined by the deflection members 11, 12 rotated in linkage with the focusing unit.

More specifically, the lens barrel 1d is made rotatable by 90° from the reference position (0° for the object at an infinite distance) like the deflection members 11, 12, and this rotation causes the movement of the focusing unit by 7.09 mm in the axial direction as will be explained later. Also the focusing unit is so controlled that, when rotated by an angle α the same as that of the deflection member 11 shown in Table 2, the system is focused on the object distance defined by the deflection members.

As an example, the parameters such as the focal length of the focusing unit and the focusing cam groove are so designed that the system is focused on the infinite disntace for a rotation angle of the lens barrel of 0° (amount of advancement of the focusing unit= 0), a distance of 2000.7 mm for a rotation angle of 60° (amount of advancement of the focusing unit=6.07), or a shortest distance of 1000 mm for rotation angle of 90° (amount of advancement of the focusing unit=7.09).

Table 2 also shows the rotation angle α of the lens barrel 1d, and the amount Δx of advancement of the focusing unit.

In the present embodiment, the two prisms of the deflection member need not necessarily be rotated by 90°, but may be stopped on the way (for example at about 80°). In such a case, the rotation of the focusing unit of the image taking system may likewise be stopped on the way.

Figure 6:
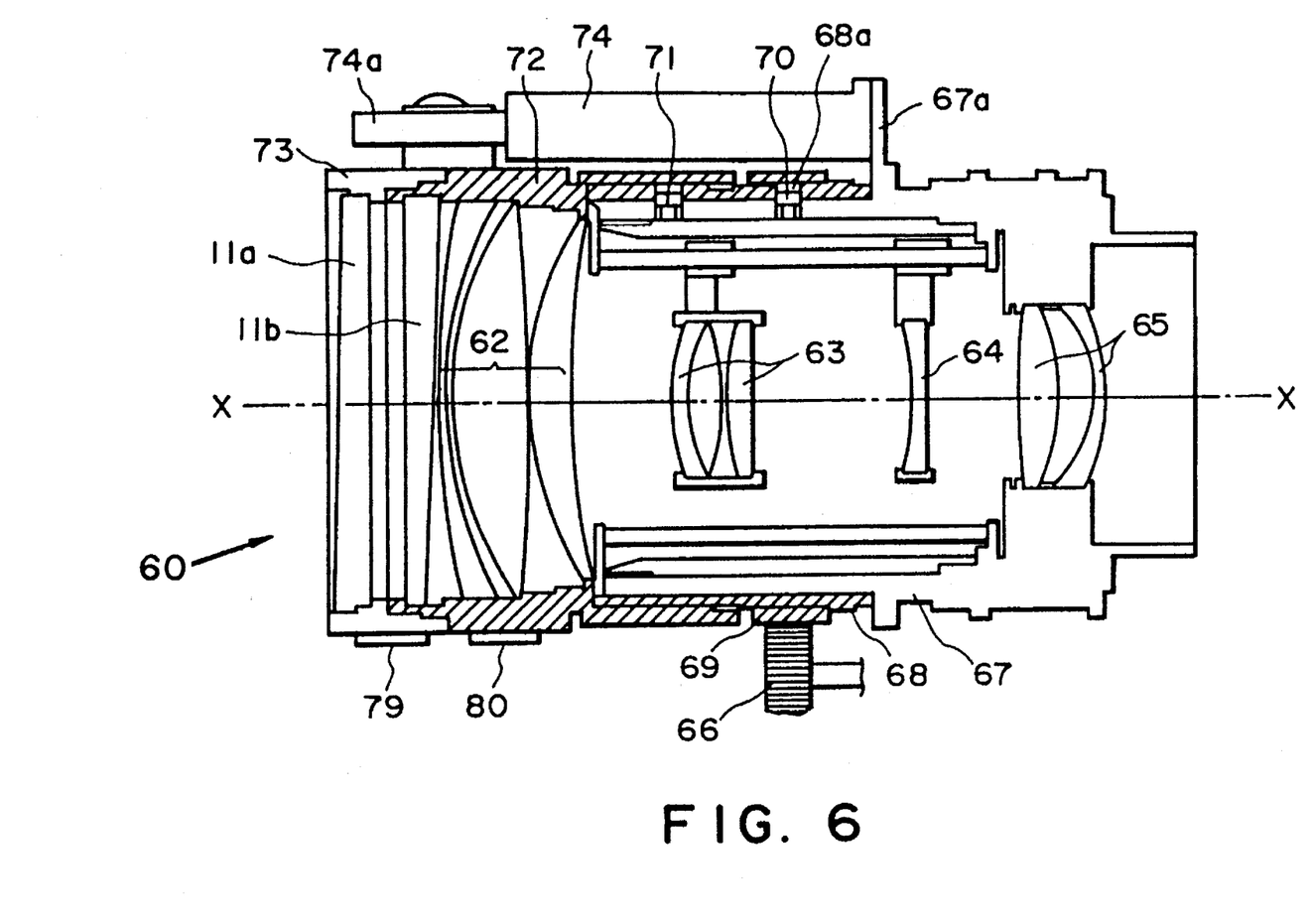
FIG. 6 is a schematic view of an embodiment of the lens barrel of the image taking system of the present invention.
Figure 7:
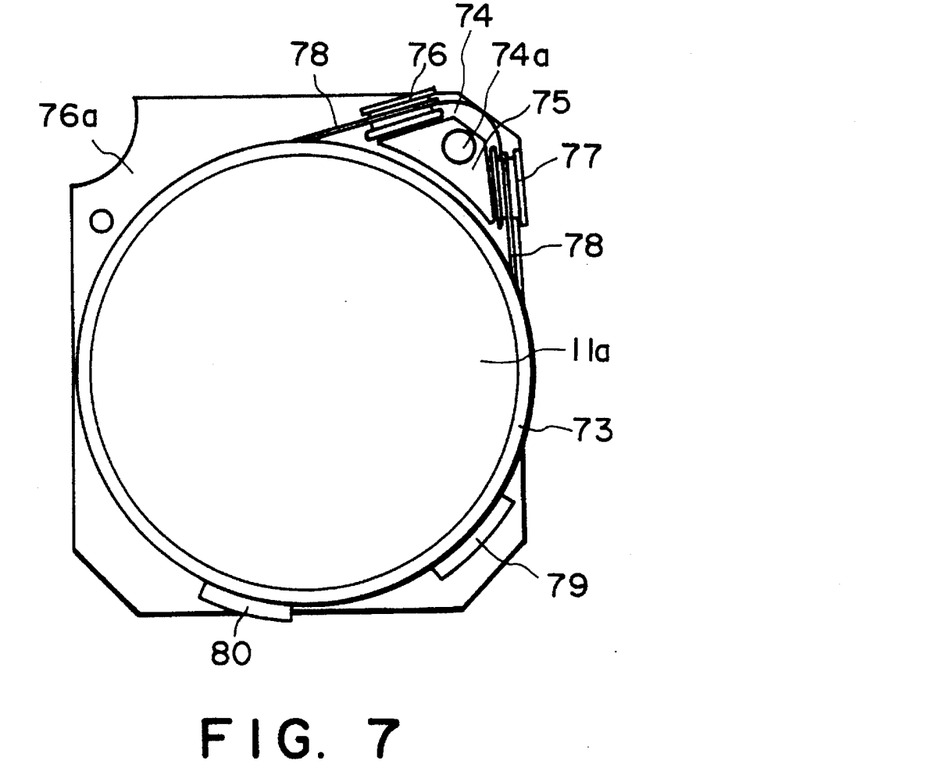
FIG. 7 is a schematic view of a part of the lens barrel shown in FIG. 6.

FIG. 6 is a schematic view of an embodiment showing a mechanism for exploiting the present invention. Though there are provided two image taking systems 60, 61 in parallel, only one of said systems is shown in detail, since they have identical internal structures. FIG. 7 is a schematic front view of said image taking system 60 or 61.

In FIG. 6, there are shown a focusing lens 62, a variator lens 63, a compensator lens 64, and a relay lens 65.

There are further shown a focusing gear 66 rotated by an unrepresented driving mechanism; a fixed lens barrel 67; and a driving cam tube 68 provided therearound with gears 69, 69' meshing with the focusing gears 66 for synchronously driving the image taking system 60, 61. Said driving cam tube 68 is slidable in the axial direction x, with respect to the fixed lens barrel 67.

A cam groove 68a is provided on the cam tube 68, with a shape as shown in FIG. 4. A cam pin 70 fixed on the fixed lens barrel 67 engages with the cam groove. Another pin 71 is provided for preventing the rotation of the lens barrel in excess of 90°. A lens supporting tube 72 supports the focusing lens 62 and a wedge-shaped prism 11b, and is coupled with said driving cam tube 68 for integral rotational and axial movements. However, the lens supporting tube 72 and the driving cam tube 68 are helicoid coupled for initial position setting of the lens. A prism supporting tube 73 supports the other wedge-shaped prism 11a and is rotatably fitted on the lens supporting tube 72.

Figure 8:
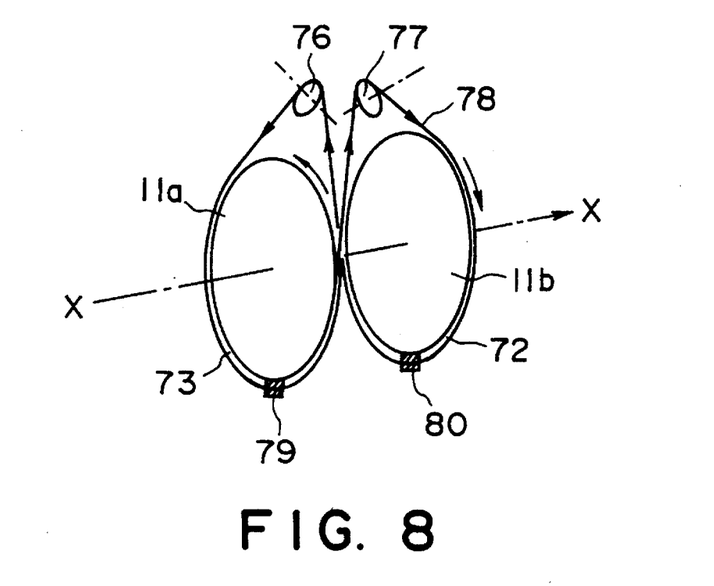
FIG. 8 is a schematic view showing the mode of driving of the deflection members shown in FIG. 6.

A slidable bearing 74, with axially movable shaft 74a, is mounted on a protruding portion 67a of the fixed lens barrel 67. A pulley mounting member 75 (FIG. 7), fixed on the shaft 74a, rotatably supports pulleys 76, 77. A wire 78 runs on said pulleys 76, 77 and runs around the lens supporting tube 72 and the prism supporting tube 73 in criss-cross manner as shown in FIG. 8. Since said wire 78 is fixed to the prism supporting tube 73 and the lens supporting tube 72 respectively by fixing members 79, 88, the rotation of the lens supporting tube 72 causes an inverse rotation of the prism supporting tube 73 in 1:1 relationship.

The driving mechanism for the variator lens 63 and the compensator lens 64 is already known and will therefore be omitted from detailed explanation.

In the above-explained structure, the rotation of the focusing gear 66 causes the rotation of the gear 69 (69') meshing therewith, thereby rotating the driving cam tube 68. As the cam pin engages with the cam groove 68a of the driving cam tube 68, the driving cam tube 68 moves in the axial direction x according to the cam lift. Thus the lens supporting tube 72 fixed to the driving cam tube 68 performs rotation as well as axial movement. The rotation of the lens supporting tube 72 induces the rotation of the prism supporting tube 73 as explained before, thus inducing differential rotation of the wedge-shaped prisms 11a, 11b.

Thus, there are simultaneously effected the focusing of lens 62 and the deflection of the optical axes, also in synchronization with those operations of the other image taking system 60.

TABLE 2

| Prism rotation angle α(°) | Prism vertical angle θ11a(θ11b) (°) | Synthesized prism vertical angle β(°) | Image taking distance S (mm) | Advancing amount of focusing unit Δx (mm) |
| --- | --- | --- | --- | --- |
| 0 | 0 | 0 | ∞ | 0 |
| 7.5 | 0.14 | 0.29 | 7188.3 | 0.87 |
| 15 | 0.27 | 0.53 | 3865.3 | 1.73 |
| 22.5 | 0.39 | 0.79 | 2614.1 | 2.59 |
| 30 | 0.52 | 1.03 | 2000.7 | 3.41 |
| 37.5 | 0.63 | 1.26 | 1643.1 | 4.18 |
| 45 | 0.73 | 1.46 | 1414.5 | 4.90 |
| 52.5 | 0.82 | 1.64 | 1260.7 | 5.53 |
| 60 | 0.89 | 1.79 | 1154.8 | 6.07 |
| 67.5 | 0.95 | 1.90 | 1082.5 | 6.51 |
| 75 | 1.00 | 1.99 | 1035.3 | 6.83 |
| 82.5 | 1.02 | 2.04 | 1008.6 | 7.02 |
| 90 | 1.03 | 2.06 | 1000 | 7.09 |

As explained in the foregoing, the embodiment of the present invention, in which deflection members each composed of two prisms of a predetermined shape are positioned respectively in front of two image taking systems arranged with mutually parallel optical axes and said two prisms of the deflection member are rotated in linkage with the focusing unit of the image taking system, can provide a stereo image forming apparatus which allows easy and prompt focusing on an object at varying distances without rotation of the image taking systems, thereby providing a satisfactory stereo image.

We claim:

1. A stereo image forming apparatus, comprising:
   a photographing optical system having two optically independent optical axes;
   a focusing operation unit for outputting a focus signal corresponding to a focus condition of said photographing optical system;
   a light deflection member located on each said optical axis for deflecting light; and
   adjusting means for adjusting a light deflection condition of each said light deflection member in response to the focus signal output by said focusing operation unit to cause two deflected light paths to cross each other.

2. A stereo image forming apparatus according to claim 1, wherein each light deflection member comprises a vertical angle variable prism.

3. A stereo image forming apparatus according to claim 2, wherein each said vertical angle variable prism comprises two wedge-shaped prisms, and wherein said adjusting means rotates each set of said two wedge-shaped prisms around its respective optical axis as a rotation center in accordance with the focus adjusting operation.

4. A stereo image forming apparatus according to claim 1, wherein said adjusting means adjusts the light deflection condition of said deflection members in such a manner that a distance to a point at which the two deflected light paths cross is substantially equal to a distance which corresponds to a focal point of said photographing optical system.

5. A stereo image forming apparatus according to claim 3, wherein each of said two wedge-shaped prisms comprises adhered partial prisms having different Abbe numbers.

6. A stereo image forming system, comprising:

a photographic optical means having two optically independent optical axes;

a focusing operating unit for outputting a focus signal corresponding to a focus state of said photographic optical means;

a light refracting means located on each said optical axis for refracting light; and adjusting means for adjusting a light refraction condition of each said light refracting means in response to the focus signal output by said focusing operating unit to cause two reflected light paths to cross each other.

7. A stereo image forming system according to claim 6, wherein each light refracting means comprises a vertical angle variable prism.

8. A stereo image forming system according to claim 7, wherein each said vertical angle variable prism comprises two wedge-shaped prisms, and wherein said adjusting means rotates each set of said two wedge-shaped prisms around its respective optical axis as a rotation center in accordance with the focus adjusting operation.

9. A stereo image forming system according to claim 8, wherein each of said two wedge-shaped prisms comprises adhered partial prisms having different Abbe numbers.

10. A stereo image forming system according to claim 6, wherein said adjusting means adjusts the light refracting condition of said refracting means in such a manner that a distance to a point at which the two refractive light paths cross is substantially equal to a distance which corresponds to a focal point of said photographic optical means.

11. An apparatus according to claim 1, wherein said focusing operation unit and said adjusting means are mechanically connected to each other.

12. An apparatus according to claim 1, wherein said photographing optical system includes a pair of image taking lens means each having a focusing lens unit and an optical axis, and wherein said light deflection member includes a pair of wedge-shaped prisms each located in front of said image taking lens means so as to relatively rotate in reverse directions in such a manner that one of said wedge-shaped prisms rotates in the same direction and the same amount as the rotation of said focusing lens unit.

13. An apparatus according to claim 12, wherein one of said wedge-shaped prism and said focusing lens unit are supported by a lens barrel in a body.

14. A system according to claim 6, wherein said focusing means and said adjusting means are mechanically connected with each other.

15. A system according to claim 6, wherein said photographic optical means includes a pair of image taking lens means each having a focusing lens unit and an optical axis, and wherein said light refracting means includes a pair of wedge-shaped prisms each located in front of said image taking lens means so as to relatively rotate in reverse directions in such a manner that one of said wedge-shaped prisms rotates in the same direction and the same amount as the rotation of said focusing lens unit.

16. A system according to claim 15, wherein one of said wedge-shaped prisms and said focusing lens unit are supported by a lens barrel in a body.

17. A stereo image forming apparatus, comprising:

a photographing optical device having an imaging lens system which includes two parallelly-disposed and optically independent optical axes, two imaging planes, and two independent focus adjusting means, for imaging an object image onto the respective imaging planes;

a focus operation unit for outputting a focus signal corresponding to a focus state of said photographing optical device;

a pair of optical deflection members for deflecting a light beam, each optical deflection member being located on a respective optical axis of said photographing optical device and on an object side of said lens system;

a pair of deflection adjusting means for respectively adjusting a deflection state of said deflection members so that two deflection light paths cross each other on a single plane;

a pair of interlocking means respectively disposed on said optical axes of said photographing optical device, said interlocking means respectively driving said focus adjusting means and said deflection members in response to the signal from said focus operation unit so that the driving amounts of each pair of focus adjusting means and deflection member have a predetermined relation;

operation driving means for driving said pair of interlocking means simultaneously by the same driving amount with a single operation, wherein, by the operation of said operation driving means, movement for focus adjusting is interlockingly executed with movement for deflection adjustment, and a distance to a point at which said two deflected light paths cross each other substantially equals a focal length of said photographing optical system.

18. An apparatus according to claim 17, wherein said photographing optical device includes a pair of image taking lens means each having a focusing lens unit and an optical axis, and wherein each said light deflection member includes a pair of wedge-shaped prisms each located in front of said image taking lens means so as to relatively rotate in reverse directions in such a manner that one of said wedge-shaped prisms rotates in the same direction and the same amount as the rotation of said focusing lens unit.

19. An apparatus according to claim 18, wherein said focusing lens unit and said adjusting means are mechanically connected with each other.

20. Apparatus according to claim 1, wherein said photographing optical system comprises first and second focusing lenses respectively disposed on said two optical axes, optical axes of said two focusing lenses being fixed with respect to each other.

21. A system according to claim 6, wherein said photographic optical means comprises first and second focusing lenses respectively disposed on said two optical axes, optical axes of said first and second focusing lenses being fixed with respect to each other.

22. A stereo image forming apparatus according to claim 1, wherein said focusing operation unit mechanically outputs the focus signal to said adjusting means.

23. A stereo image forming apparatus according to claim 6, wherein said focusing operating unit mechanically outputs the focus signal to said adjusting means.

24. A stereo image forming apparatus according to claim 17, wherein said focusing operation unit mechanically outputs the focus signal to said pair of interlocking means.

25. A stereo image forming apparatus, comprising:

a photographing optical system having two optically independent optical axes;

focusing moving means for moving in correspondence with a focus condition of said photographing optical system;

a light deflection member located on each said optical axis for deflecting light; and adjusting means for adjusting a light deflection condition of each said light deflection member in response to movement of said focusing moving means to cause two deflected light paths to cross each other.

26. Apparatus according to claim 25, wherein each light deflection member comprises a vertical angle variable prism.

27. Apparatus according to claim 26, wherein each said vertical angle variable prism comprises two wedge-shaped prisms, and wherein said adjusting means rotates each set of said two wedge-shaped prisms around its respective optical axis as a rotation center in accordance with the focus adjusting operation.

28. Apparatus according to claim 27, wherein each of said two wedge-shaped prisms comprises adhered partial prisms having different Abbe members.

29. Apparatus according to claim 25, wherein said adjusting means adjusts the light deflection condition of said deflection members in such a manner that a distance to a point at which the two deflected light paths cross is substantially equal to a distance which corresponds to a focal point of said photographing optical system.

30. Apparatus according to claim 25, wherein said focusing moving means and said adjusting means are mechanically connected to each other.

31. Apparatus according to claim 25, wherein said photographing optical system includes a pair of image taking lens means each having a focusing lens unit and an optical axis, and wherein said light deflection member includes a pair of wedge-shaped prisms each located in front of said image taking lens means so as to relatively rotate in reverse directions in such a manner that one of said wedge-shaped prisms rotates in the same direction and the same amount as the rotation of said focusing lens unit.

32. Apparatus according to claim 31, wherein one of said wedge-shaped prism and focusing lens unit are supported by a lens barrel in a body.

33. Apparatus according to claim 25, wherein said photographing optical system comprises first and second focusing lenses respectively disposed on said two optical axes, optical axes of said two focusing lenses being fixed with respect to each other.

* * * * *

UNITED STATES PATENT AND TRADEMARK OFFICE
CERTIFICATE OF CORRECTION

PATENT NO. : 5,486,948
DATED : January 23, 1996
INVENTOR(S) : IMAI et al

It is certified that error appears in the above-indentified patent and that said Letters Patent is hereby corrected as shown below:

COLUMN 2

Line 42, "system" should read --systems--; and
Line 46, "system." should read --systems.--.

COLUMN 4

Line 7, "there" should read --thereby--.

COLUMN 5

Line 9, "disntace" should read --distance--.

COLUMN 7

Line 51, "prism" should read --prisms--.

COLUMN 8

Line 25, "relation;" should read --relation; and--;
Line 27, "amount" should rad --amounts--; and
Line 39, "light" should read --optical--.

COLUMN 9

Line 23, "members." should read --numbers.--

UNITED STATES PATENT AND TRADEMARK OFFICE
CERTIFICATE OF CORRECTION

PATENT NO.    : 5,486,948
DATED         : January 23, 1996
INVENTOR(S)   : IMAI et al It is certified that error appears in the above-indentified patent and that said Letters Patent is hereby corrected as shown below:

<u>COLUMN 10</u>

Line 18, "prism" should read --prisms--.

Signed and Sealed this

Second Day of July, 1996

BRUCE LEHMAN

*Attest:*

*Attesting Officer*           *Commissioner of Patents and Trademarks*